(12) United States Patent
Choi et al.

(10) Patent No.: US 9,177,055 B2
(45) Date of Patent: Nov. 3, 2015

(54) SYSTEM FOR DISPLAYING AND MANAGING INFORMATION ON WEBPAGE USING INDICATOR

(76) Inventors: Moon-Sung Choi, Seoul (KR); Man-Jin Han, Seoul (KR); Tae-Kyun Kim, Seoul (KR)

( * ) Notice: Subject to any disclaimer, the term of this patent is extended or adjusted under 35 U.S.C. 154(b) by 503 days.

(21) Appl. No.: 12/446,215

(22) PCT Filed: Oct. 12, 2007

(86) PCT No.: PCT/KR2007/004997
§ 371 (c)(1),
(2), (4) Date: Apr. 17, 2009

(87) PCT Pub. No.: WO2008/048021
PCT Pub. Date: Apr. 24, 2008

(65) Prior Publication Data
US 2010/0211461 A1    Aug. 19, 2010

(30) Foreign Application Priority Data
Oct. 19, 2006   (KR) .................. 10-2006-0101903

(51) Int. Cl.
G06Q 30/02     (2012.01)
G06F 17/30     (2006.01)
G06F 17/21     (2006.01)
G06Q 10/10     (2012.01)
G06F 17/24     (2006.01)

(52) U.S. Cl.
CPC ........ *G06F 17/30864* (2013.01); *G06F 17/211* (2013.01); *G06Q 10/10* (2013.01); *G06Q 30/0254* (2013.01); *G06Q 30/0277* (2013.01); *G06F 17/241* (2013.01)

(58) Field of Classification Search
CPC .................. G06Q 30/02; G06Q 30/0277
See application file for complete search history.

(56) References Cited

U.S. PATENT DOCUMENTS

| | | | |
|---|---|---|---|
| 5,564,004 A * | 10/1996 | Grossman et al. | 715/835 |
| 6,262,732 B1 * | 7/2001 | Coleman et al. | 715/835 |
| 6,591,271 B1 | 7/2003 | Ceri et al. | |
| 6,804,659 B1 * | 10/2004 | Graham et al. | 705/14.49 |
| 7,593,965 B2 * | 9/2009 | Gabriel | 1/1 |

(Continued)

FOREIGN PATENT DOCUMENTS

| WO | WO 02/06917 A2 | 1/2002 |
|---|---|---|
| WO | WO 2006/080664 A1 | 8/2006 |

*Primary Examiner* — John G Weiss
*Assistant Examiner* — Vincent Cao
(74) *Attorney, Agent, or Firm* — Morgan, Lewis & Bockius LLP

(57) ABSTRACT

A system for displaying and managing information on a webpage using an indicator comprises an indicator displayed on a surface of specific contents of the webpage with reference to coordinate values corresponding to the specific contents and for classifying and elaborating on the specific contents; an indicator generation module for generating the indicator comprising a block setting portion for predicting a width of the specific contents, a coordinate setting portion for grasping the coordinate value of a webpage area corresponding to the specific contents, an input portion for inputting information to be recorded in the indicator, a storage portion for storing the coordinate value and an output portion for outputting the indicator to the specific contents based on the information stored in the storage portion; and an indicator database stored in the system server through the storage portion and collected according to a specific classification.

9 Claims, 10 Drawing Sheets

(56) References Cited

U.S. PATENT DOCUMENTS

| | | | |
|---|---|---|---|
| 8,061,604 B1* | 11/2011 | Wobbe et al. | 235/385 |
| 2002/0040475 A1* | 4/2002 | Yap et al. | 725/39 |
| 2002/0054117 A1* | 5/2002 | van Dantzich et al. | 345/766 |
| 2002/0103673 A1* | 8/2002 | Atwood | 705/2 |
| 2002/0111898 A1* | 8/2002 | Numaoka et al. | 705/37 |
| 2003/0093427 A1* | 5/2003 | Hsu et al. | 707/10 |
| 2003/0160694 A1* | 8/2003 | DeMatteo | 340/539.13 |
| 2003/0208472 A1* | 11/2003 | Pham | 707/2 |
| 2004/0034706 A1* | 2/2004 | Cohen et al. | 709/225 |
| 2004/0138946 A1* | 7/2004 | Stolze | 705/14 |
| 2004/0260767 A1* | 12/2004 | Kedem et al. | 709/203 |
| 2005/0160357 A1* | 7/2005 | Rivette et al. | 715/512 |
| 2005/0171946 A1* | 8/2005 | Maim | 707/5 |
| 2005/0234893 A1* | 10/2005 | Hirsch | 707/3 |
| 2005/0256797 A1* | 11/2005 | Tyulyaev | 705/37 |
| 2006/0026523 A1* | 2/2006 | Kitamaru et al. | 715/708 |

* cited by examiner

Webpage 40

(a)

(b)            (c)

SYSTEM FOR DISPLAYING AND MANAGING INFORMATION ON WEBPAGE USING INDICATOR

CROSS REFERENCE TO RELATED APPLICATIONS

This Application is a United States National Stage Application filed under 35 U.S.C. §371 of PCT Patent Application Serial No. PCT/KR2007/004997 filed on Oct. 12, 2007, which claims the benefit of and priority to Korean (KR) Patent Application Serial No. 10-2006-0101903 filed on Oct. 19, 2006, the disclosures of both of which are hereby incorporated by reference in their entirety.

TECHNICAL FIELD

The present invention relates to a system for displaying and managing information on a webpage using an indicator. More particularly, the present invention relates to a system for displaying and managing information on a webpage using an indicator in which, where various information are outputted in one webpage through a monitor, desired specific information is provided with a block space as an indicator so that it can be differentiated from other information, a plurality of indicators generated by various users can be piled in the form of a multilevel, the indicators generated by users and the web pages having the indicators can be collected as a database, and the specific information of each webpage can be selectively arranged and easily classified/managed according to a setting manner of a priority order thereof.

BACKGROUND ART

In the modern societies, according to great developments of an internet, it can easily search and obtain various information, which were obtained through a newspaper or a library reading in the past, by means of the internet.

That is, the internet user inputs the specific keyword through a keyboard of computer by using a webpage having various search engines capable of searching various information and specific contents, so that the user can easily obtain the pertinent webpage containing the specific information.

Presently, according to the developments of various search engines in the information search field using the internet, for example, easy functions such as an automatic word completion and a relation word search and so forth occur in succession, so that it can play a part in searching the information in variously famous internet portal sites.

DISCLOSURE OF INVENTION

Technical Problem

However, in a general internet search engine, since the target search is mainly restricted to the specific word, the search engine servers to play a role in finding only superficially and fragmentary information including the pertinent word inevitably. Accordingly, it cannot provide the systematical and concrete classification and explanation on the pertinent conception in case that the user intends to find the information on any specific conception like special books. That is, for example, in case that a word "patent" is searched, the conventional search engine can serve to fully find the pertinent webpage standing for words such as "patent office" or "procedure of patent application and so on including the word "patent". However, it has difficulty in finding in-depth and extension information, for example, "relation between intellectual property with patent and general property" and "logic of patent disputes and cases thereof". Also, the group of the information divides into various parts according to the category such as "history of patent", "patent system of each nation", "kind of patent" and so forth. However, in order to find the information of specific field, there is a considerable inconvenience that the user searches each webpage including "patent" searched innumerably one by one.

The reason is because the conventional search engine conducts a specific word-centered search, not general contents-centered one as described above. That is, in order to search the information around the whole contents thereof, it is necessary for the search engine itself to analyze the contents of the information. However, even though a developed intelligent search engine is used, it has difficulty in providing the search function capable of analyzing the contents of the webpage.

In other words, since the information includes comparative values related to subjective values or experiences (for example, an article and editorial in newspaper, contents expressing a personal opinion or experience and so forth), there is a limit in that the objective information cannot be accurately provided in case of mechanically searching the information. Accordingly, it is necessary to record the opinions of many peoples on the information therein more or less and establish the verification and priority order of the recorded information.

Especially, there is a reply culture capable of recording the opinions of many people on the specific information in order to accomplish the above purpose more or less. However, in case of the reply culture, since ill-intentioned or superficial contents or are mainly written anonymously, there is a considerable limit in that it does not play a role in providing an objective value on the information.

Also, since various web pages are existed in the websites, there is an inconvenience in that it is necessary to search all of the web pages one by one in order to find the specific information. Moreover, as though the desired information is checked out through a favorites function, where the contents of a large quantity are recorded in one webpage, for example, where the target information is existed in a second paragraph, 4 page of a webpage having total 10 pages (A4 paper), it has difficulty in finding quickly the desired contents. Furthermore, in case that the webpage of a large quantity are recorded in the favorites, it is difficult to smoothly manage each webpage on account of the confusion of the priority order on each webpage.

In the twenty-first century, since we live in the flood of information, it is not important as to whether a specific information is existed in the well-known search engine or not or how many information there are existed. That is, on the assumption that many web pages on the specific information are already existed, there is a key point in that the specific information can be more rapidly and accurately searched to be recognized as actual information and the webpage for recording the actual information can be managed in groups. Accordingly, it has been demanded that an important indication is displayed on only the desiring information in various web pages and it is systematically sorted to share with other user, so that it can establish the verification and priority order of the information, thereby creating a new paradigm capable of differentiating more and more and being useful in interne information search/manage fields.

Technical Solution

Accordingly, the present invention has been made to solve the above-mentioned problems occurring in the prior art, and a main object of the present invention is to provide a system for displaying and managing information on a webpage using an indicator capable of minutely searching a searched information of a second order, that is, broad information recorded in specific information on the basis of a user characteristic and objective classification as well as separately managing the webpage by means of a specific indicator using coordinate values of a web browser so as to make it information of a first order necessary for special manage.

Another object of the present invention is to provide a system for displaying and managing information on a webpage using an indicator capable of displaying a related advertisement by means of a classifier of the indicator.

Still another object of the present invention is to provide a system for displaying and managing information on a webpage using an indicator in that the indicators managed by a specific user are collected as a database to share the indicators with other user in real-time, whereby providing a convenience of information search and manage.

Still another object of the present invention is to provide a system for displaying and managing information on a webpage using an indicator in that a plurality of indicators generated by various users is piled in the form of a multilevel, whereby checking out various valuations and classifications and so on.

Still another object of the present invention is to provide a system for displaying and managing information on a webpage using an indicator in that the number of the piled indicators or the piled number thereof for a predetermined time are measured, so that the pertinent indicator is changed in color or it becomes extinct, thereby easily evaluating it as objective and universal information.

Still another object of the present invention is to provide a system for displaying and managing information on a webpage using an indicator in that the indicator database managed by other user can be reorganized according to user's taste, whereby managing systematically the information.

As described above, according to the system for displaying and managing information on the webpage using the indicator, Firstly, a memo and so forth can be recorded in the desired contents of the webpage through the indicator and the URL of the webpage can be stored with the indicator to call out them at anytime, whereby classifying systematically, searching quickly, and pursuing deeply the information.

Secondly, the indicators are collected as a database to share the indicators with other user in real-time, whereby providing a convenience of information search and manage.

Thirdly, each indicator is evaluated by various users and the plurality of indicators generated by various users is piled in the form of a multilevel, whereby improving the interests on the entire information of the users and checking out various valuations and opposite views of other users.

Fourthly, the number of the piled indicators or the time variation according to the piled number thereof is measured, so that the values of the information can be vividly evaluated and managed.

Fifthly, the indicator database managed can be edited and reedited according to user's taste, whereby easily checking out the importance and classification status of the information according to user's taste.

Finally, the advertisements can be displayed in the indicator, so that the system operator can guarantee the advertising gains as well as the advertisement itself can be provided as one information.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

In order to accomplish the above objects, according to the present invention, there is provided a system for displaying and managing information on a webpage using an indicator having a client server and a system server comprising: an indicator displayed on a surface of specific contents of each webpage with reference to coordinate values corresponding to the specific contents of each webpage and for classifying and elaborating on the specific contents; an indicator generation module for generating the indicator comprising a block setting portion for predicting a width of the specific contents of the pertinent webpage, a coordinate setting portion for grasping the coordinate value of a webpage area corresponding to the specific contents predicted by the block setting portion, an input portion for inputting information to be recorded in the indicator, a storage portion for storing the coordinate value of the coordinate setting portion, an URL (uniform resource locator) of the pertinent webpage, and the input information of the input portion, and an output portion for outputting the indicator to the specific contents of the pertinent webpage based on the information stored in the storage portion; and an indicator database stored in the system server through the storage portion and collected according to a specific classification.

Preferably, the indicator comprises a classifier for illustrating a title on the content information of the pertinent webpage, a keyword indicator for illustrating a path or a keyword for finding the pertinent webpage, an information indicator for recording actual contents capable of displaying the evaluation as a memo, elaborate comment, and information of the pertinent webpage, a category indicator for setting up categories of the specific contents of the pertinent webpage, a file attaching means for transmitting the pertinent attached file to the system server and calling it.

Mode for the Invention

Hereinafter, the present invention will be described with reference to accompanying drawings.

Figure 1:
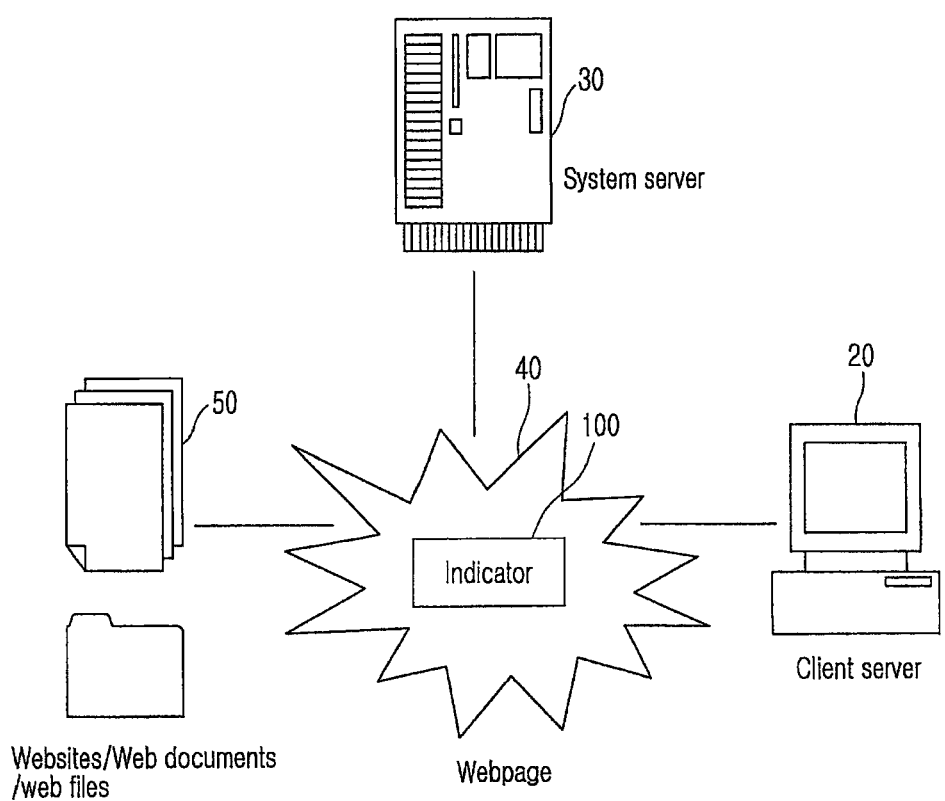
FIG. 1 is a schematic block diagram illustrating a system for displaying and managing information on a webpage using an indicator according to the present invention.

FIG. 1 is a schematic block diagram illustrating a system for displaying and managing information on a webpage using an indicator according to the present invention.

In the system 10 for displaying and managing information on the webpage using the indicator according to the present invention, an unique indicator 100 is freely attached on a content of the webpage 40 and the webpage 40 having the indicator 100 is separately stored with and classified into websites 50, web documents, files and so on. At the same time, the system 10 includes a client server 20 as the subject for generating the indicator 100 and a system server 30 for assisting and managing the generation process, so that each server 20 and 30 is communicated with each other in real-time through the websites 50 and wire or wireless communication to share the indicator 100, thereby usefully utilizing specialized information of other users including oneself.

Figure 2:
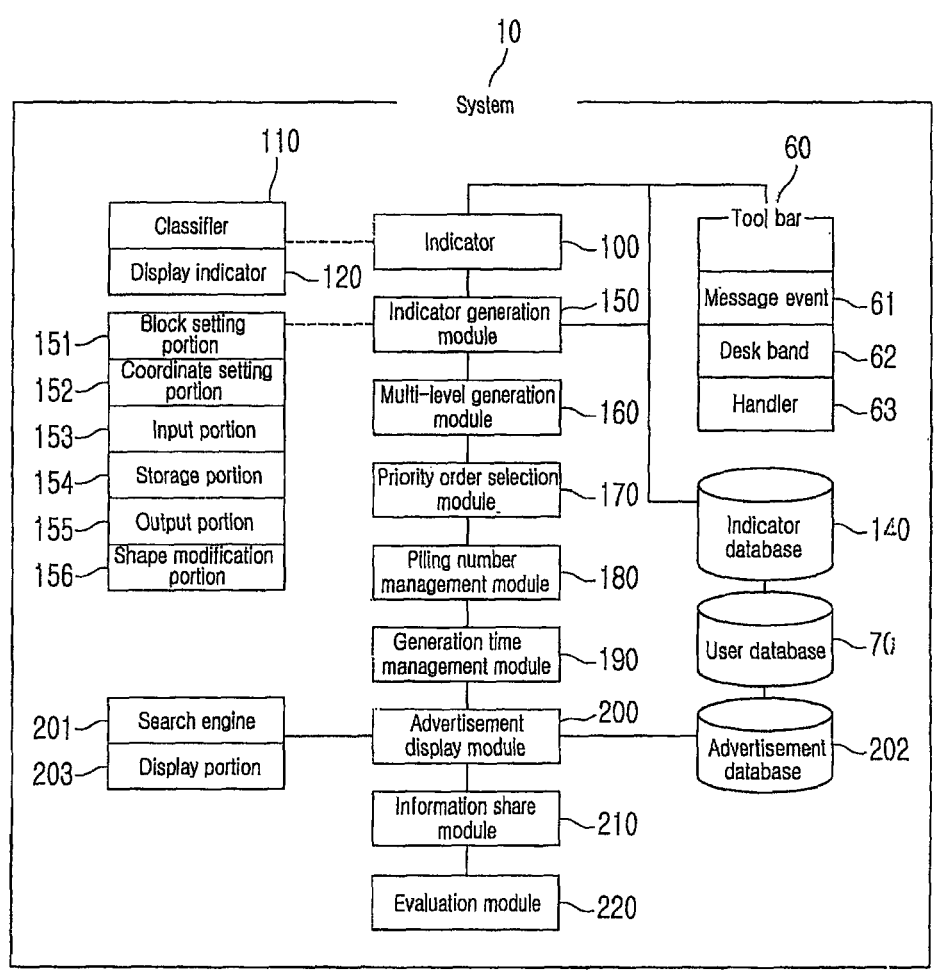
FIG. 2 is a concrete block diagram illustrating a system for displaying and managing information on a webpage using an indicator according to the present invention.
Figure 3:
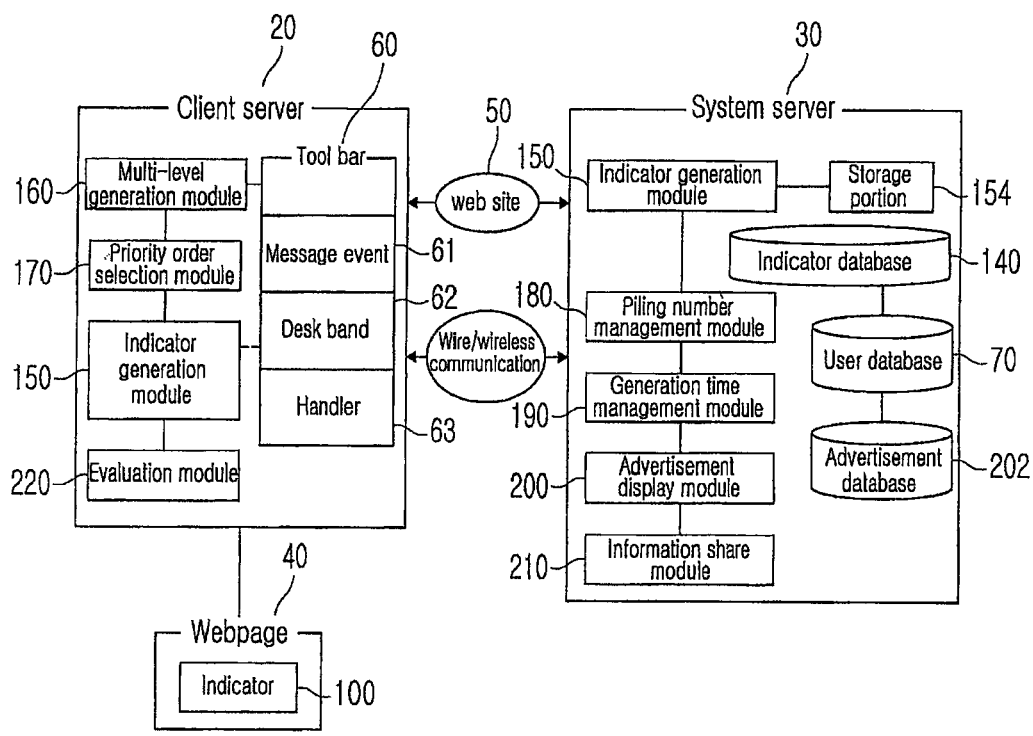
FIG. 3 is a concrete block diagram illustrating a relation between each server of a system for displaying and managing information on a webpage using an indicator according to the present invention.

FIG. 2 is a concrete block diagram illustrating a system for displaying and managing information on a webpage using an indicator according to the present invention and FIG. 3 is a concrete block diagram illustrating a relation between each server of a system for displaying and managing information on a webpage using an indicator according to the present invention.

Referring to FIG. 2, the system 10 according to the present invention includes the indicator 100 generated on the webpage 40 in a state that the servers 20 and 30 are communicated with each other in real-time, an indicator generation module 150 for generating the indicator 100, an indicator database 140 for storing an URL (uniform resource locator) of the webpage 40 having the indicator 100 together, an information share module 210 for sharing the indicator database 140, a multi-level generation module 160 for piling each webpage 40 having the indicator 100 by attaching the plurality of the indicator 100 on each webpage 40, a priority order selection module 170 for controlling and storing the indicator piling location of the multi-level generation module 160, a piling number management module 180 for measuring, analyzing and managing the number of the piled indicators 100, a generation time management module 190 for measuring and managing a pertinent time in case of maintaining the piled indicators 100 below a predetermined number, an advertisement display module 200 for displaying a related advertisement by means of a classifier 110 of the indicator 100. Also, the client server 20 has a tool bar 60 as a tool means including a message event 61, a desk band 62, and a handler 63.

As seen from FIG. 3, the client server 20 mainly operated and managed around the user includes the indicator generation module 150, the multi-level generation module 160, the priority order selection module 170, and the tool bar 60. Also, the system server 30 for synthetically operating and managing the indicator 100 and communicated with the website 50 includes the indicator database 140, the piling number management module 180, the generation time management module 190, the advertisement display module 200, and the information share module in a state of providing especially a storage portion 154 of the indicator generation module 150 of the client server 20.

Here, it is not important that each element of the system 10 according to the present invention is existed in any server. Accordingly, in the following description, the detailed function and reaction of each element will be explained around the interlocking relation and special function thereof between the client server 20 and the system server 30.

The indicator 100 according to the present invention displayed in a portion corresponding to a document, a picture, a movie and so forth included in the webpage 40 can be explained as an online memo paper on web for performing a function just like a memo paper attached on a general note or document, for example a post-it (trademark name) of a 3M company.

Concretely, the indicator 100 is provided with a block space of a predetermined size for recording an evaluation, an elaborate comment and a memo etc, on the content of the corresponding webpage 40 therein. Also, if necessary, where the pertinent indicator 100 is called out, the webpage is activated in a state of displaying the indicator 100.

Figure 4:
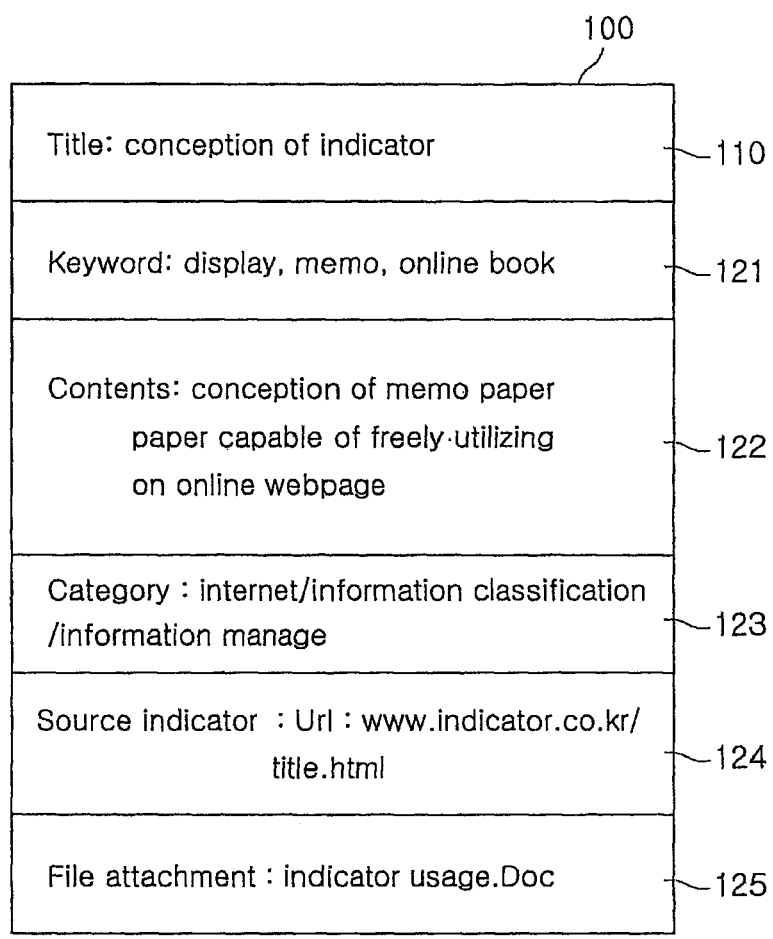
FIG. 4 illustrates a conceptual example of a system according to the present invention.
Figure 5:
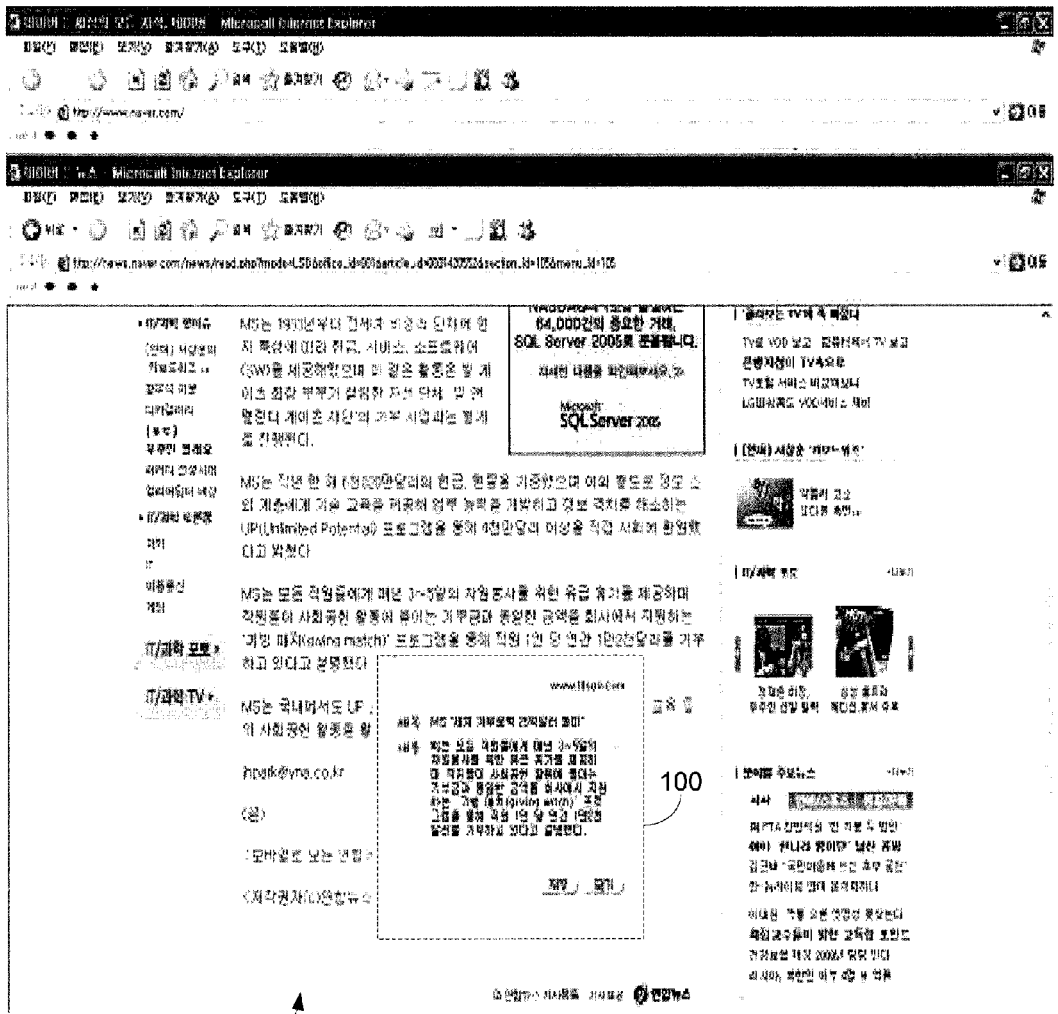
FIG. 5 is an example view illustrating a state of the indicator displayed on one side of the webpage.

FIG. 4 illustrates a conceptual example of a system according to the present invention and FIG. 5 is an example view illustrating a state of the indicator displayed on one side of the webpage.

As shown in FIG. 4, the indicator 100 includes a classifier 110 for illustrating a title on the content of the pertinent webpage 40, a keyword indicator 121 for illustrating a path or a keyword for finding the pertinent webpage, an information indicator 122 for recording actual contents capable of displaying the evaluation and so on as a memo, elaborate comment, and information of the pertinent webpage 40, a category indicator 123 for setting up categories of the pertinent information, a file attaching means 125 for transmitting the pertinent attached file to the system server 30 and calling it, and a source indicator 124 for displaying the source of the URL (uniform resource locator) of the pertinent webpage 40 and the information recorded in the information indicator 122 and so on.

The indicator 100 can be generated by a user characteristic by means of the tool bar 60. Here, the concrete generation and storage of the indicator 100 are performed through the auxiliary function of the tool bar 60 and the main function of the indicator generation module 150.

Referring to FIG. 2 and FIG. 3, the indicator generation module 150 for generating and storing the indicator 100 provided in the client server 20 and the system server 30 as a core function includes a block setting portion 151, a coordinate setting portion 152, an input portion 153, a storage portion 154, an output portion 155, and a shape modification portion 156.

Firstly, the block setting portion 151 servers to designate and select the generation location of the indicator 100 on the pertinent webpage 40 and estimate the formation area, that is, a width of the indicator 100 on the pertinent webpage 40. Here, the shape of the indicator 100 may be a square type such as a general memo paper, a trapezoid type, a circular type, an oval type and so forth by a variety of shape thereof.

The coordinate setting portion 152 servers to read the coordinate value of the webpage area 40 corresponding to the set portion set by the block setting portion 151 and express the result numerically. Generally, since all web pages 40 has regular coordinate values out of relation to the shape of the monitor, each of contents are recorded according to the coordinate information. Accordingly, the coordinate information existed already in the webpage 40 is calculated according to the location set by the block setting portion 151, so that the indicator 100 is displayed in the location of the specific webpage 40 through the coordinate values.

That is, by means of the display function of the indicator 100 according to the coordinate setting portion 152, although the sizes of each webpage 40 are different according to the size of the user screen, the proper location thereof is determined, so that the indicator 100 can be accurately displayed on the corresponding area of the webpage 40.

The input portion 153 servers to record the content of the indicator 100, that is, the classifier 110 and the display indicator 120. In the input portion 153, the concrete content can be written through the message event 61 of the tool bar 60.

The storage portion 154 servers to store the coordinate information obtained by the coordinate setting portion 152, the URL (uniform resource locator) of the pertinent webpage 40, and the input contents of the input portion 154 in order to prepare the construction of the indicator database 140. The information stored in the storage portion 154 can be directly transmitted to the system server 30 or it can be temporarily stored in a memory provided in the client server 20 and then, can be transmitted to the system server 30. The information stored in the system server 30 can be transmitted to the client server 20 in case of calling out the indicator 100 in the client server 20 later. Also, the indicator database 140 as systematical aggregates of information can be transmitted to the client server 20.

Also, examining the security of the storage portion 154, generally any document and other contents for implementing the webpage 40 are made with a HTML (hypertext markup language) document. Here, when various HTML documents including the indicator 100 are written out, since a Java script language is mainly used for making them, the source thereof is exposed to outside as it is, so that there is a vulnerability in security. Accordingly, in consideration of easy imitation of the function of the indicator 100 in other companies, the storage portion 154 can be made with a DLL (dynamic link library) file as an executable file, so that it can prevent previously the source drain on the indicator 100 and increase the processing speed thereof.

Moreover, where each information is stored in the storage portion 154, the outlines and internally basic colors can be variously expressed according to user's taste. For example, in case that the contents of the webpage 40 as a target thereof are covered with the indicators, since the contents of the webpage located below the indicator 100 are hidden owing to the indicator 100, the indicator itself can be formed translucently from the very first.

The output portion 155 serves to transmit the information stored in the storage portion 154 and display the webpage 40 and the indicator 100 illustrated on the webpage 40 through the a monitor of the client server 20 during calling of the indicator 100. Here, the user searches the content information of the indicator 100, for example, the classifier 110 of the indicator 100 in order to call out the indicator 100 or calls out the URL of the pertinent webpage 40, so that the webpage 40 having the indicator 100 can be generated and outputted.

The shape modification portion 156 servers to adjust the location of the indicator 100. That is, the shape modification portion 156 servers to provide the moving function of the indicator 100 itself and transfer the modified coordinate value to the coordinate setting portion 152, so that the location thereof is reset by the new coordinate value, thereby the size of the indicator 100 can be increased or decreased.

The tool bar 60 formed at a desktop of the client is operated by the user. The tool bar 60 servers to support the generation function of the indicator 100 of the indicator generation module 150 and guarantee the relation with the system server 30 in order to share the indicator 100 with other user. As described above, the tool bar 60 includes the message event 61, the desk band 62, and the handler 60.

The message event 61 as a tool means used by each user servers to generate the order and signal of the indicator generation and transmit or call out them to the generation module 150. More concretely, the message event 61 servers to transmit the signal generated by the user of the client server 20 to the system server 30 in order to smoothly perform the block setting function, the coordinate measurement function, and the input function of the generation module 150 and so on.

The desk band 62 as the object located at the desktop and the task bar is communicated with the system server 30 in real-time, in a state that the client server 20 is operated and each element module is executed. Also, the desk band 62 is communicated with the operated website 50 in real?time through the information share module 210.

The handler 63 servers to change the piling location and the top exposure location of each indicator 100 in the following multi-level generation module 160 and priority order selection module 170.

Figure 6:
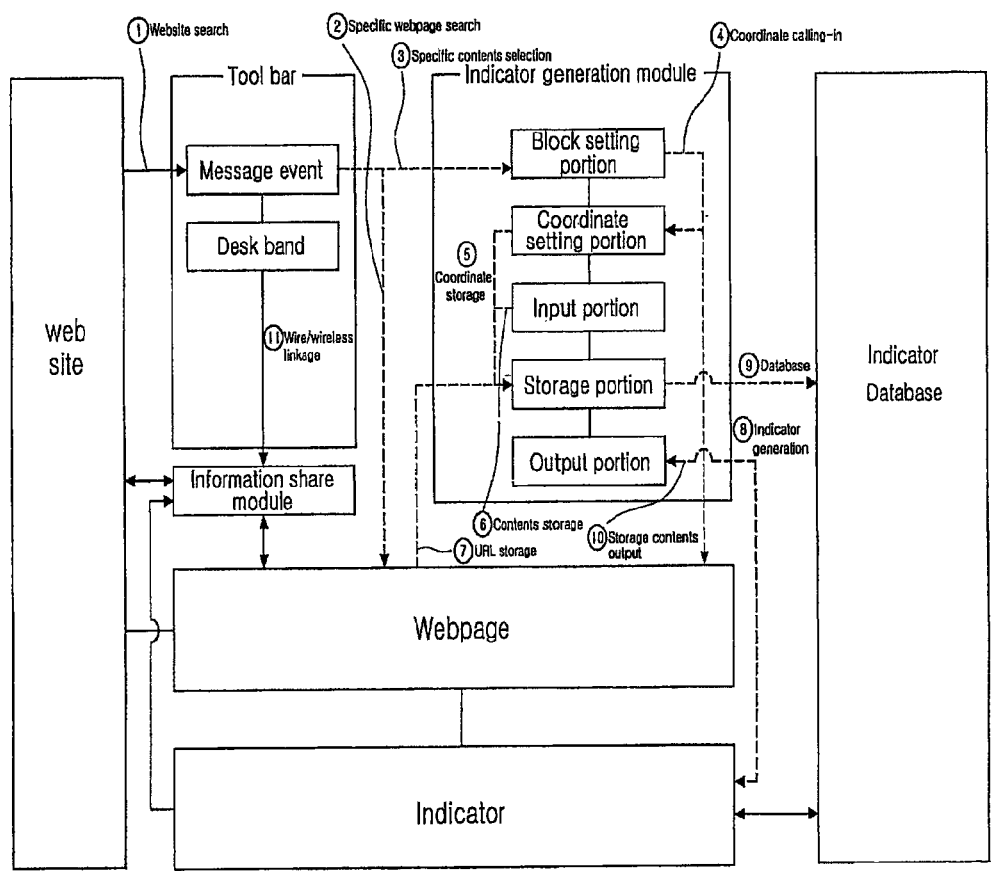
FIG. 6 is a flow chart illustrating a process in that the indicator is generated and displayed on the webpage.

FIG. 6 is a flow chart illustrating a process in that the indicator 100 is generated and displayed on the webpage 40.

As seen from FIG. 6, in case that the user of the client server 20 finds the desired information in the course of search of various web browsers, the searched web site is confirmed by means of a checking manner or a separate input manner and so on through the message event. The message event 61 servers to confirm and check (strictly speaking, catch) the state (address, download state, contents and so forth) of the specific webpage 40 and then, predict the contents selection state and the block formation portion of the selected webpage 40 in connection with the block setting portion 151.

The specific contents portion predicted by the block setting portion 151 is recognized and measured through the coordinate value on the block portion of the pertinent webpage 40, which is called in by means of the coordinate setting portion, and then, the measured value is transmitted to the storage portion 154 in order to store it.

Continuously, the user inputs the contents corresponding to the classifier 110 and the display indicator 120 into the input portion 153 and a separate display window provided by the message event 61 and transmits the contents to the storage portion 154 to be stored. The storage portion 154 servers to grasp the URL of the pertinent webpage 40 and generate the indicator database 140 along with the stored coordinate value and the contents thereof. The generated indicator 100 is outputted through the output portion 155.

At this time, the desk band 62 is activated simultaneously with the operation of the client server 20, so that it is ready to upload the indicator database 140 to the website 50 operated by the system server 30 and share it with other user through the information share module 210.

Again, referring to FIG. 2 and FIG. 3, the indicator database 140 according to the present invention is communicated with the storage portion 154 of the indicator generation module 150, so that each information is subdivided according to each purpose and classification taste. Accordingly, it can be classified among the contents displayed on each indicator 100 and the specific contents of each webpage 40 and so on, so that the indicator groups can be data-processed according to each purpose.

For example, in case of the indicator database 140 having the contents on a photograph, the contents on the photograph can be subdivided into middle groups according to products of each photographer, an understanding thereof, a method of taking a photograph well, a kind and characteristic of a camera and so on. Also, each middle group is again classified into small groups according to each of contents. Accordingly, the contents of the classified groups are stored in the system server 30, so that they can be called out at any time in case of need in order to be displayed with the pertinent webpage 40. Therefore, the indicator database 140 according to the specific purpose can be utilized just like a technical book on "photograph" on the web surroundings of on-line.

Separate webpage, on-line documents and separate files are stored in the indicator database 140 by means of the list processing and each indicator list provides a hyperlink function, so that it can be immediately moved to the pertinent webpage 140 by means of user's click. Preferably, in consideration of the security, it can be stored as a DLL file for code, so that only a qualified user can check out the pertinent indicator database 140.

Figure 7:
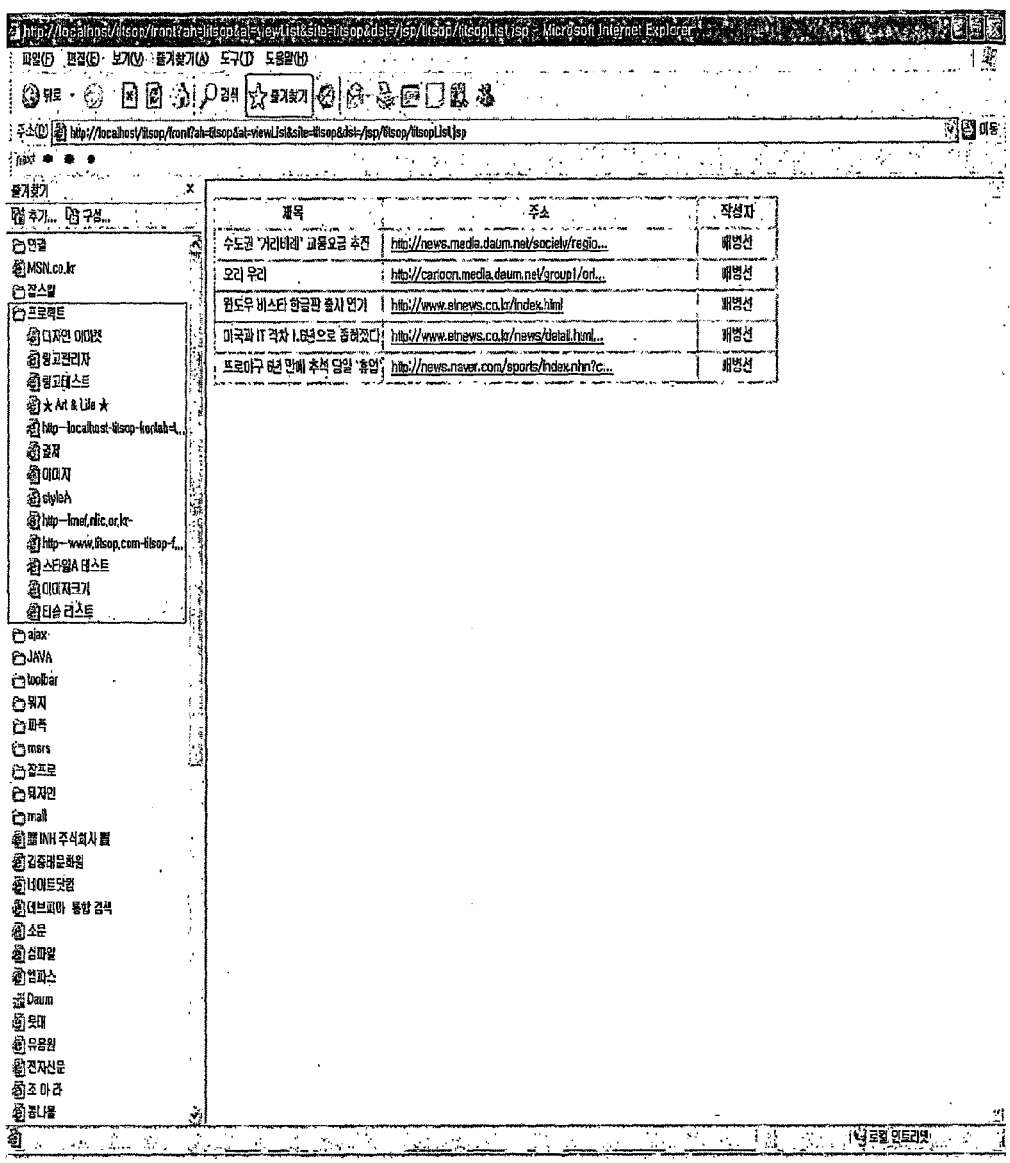
FIG. 7 is an example view illustrating a state in that the indicate database is embodied on one webpage.

FIG. 7 is an example view illustrating a state in that the indicate database 140 is embodied on one webpage.

As seen from FIG. 7, the indicate database 140 is embodied on a separate webpage, so that the user can easily find it by means of favorites function. Also, a list process is conducted according to the specific purpose and each indicator list provides a hyperlink function, so that it can be immediately moved to the pertinent webpage 140 having the indicator 100 by means of user's mouse click.

Again, referring to FIG. 2 and FIG. 3, the information share module 210 serves to transmit the indicator database 140 grouped by the first user to the client servers 20 of other users of the second and third and so forth communicated with the system server 30 and the website 50 operated by the system server 30 in order to share the indicator database 140.

Concretely, the indicator database 140 stored in the system server 30 can be uploaded through an independent website 50 operated by the system server 30. Where other users of the second and third and so forth intend to obtain the indicator database 140 of the first user, the link icon of the desk band 62 provided in the tool bar 60 of the client server 20 is clicked by other users, so that the indicator database 140 of the first user is transmitted to the client servers 20 of other users of the second and third and so forth. At this time, where the pertinent webpage 40 is displayed on the monitor by the second and third users, the indicator 100 can be displayed on the monitor along with the webpage 40. Also, the desk band 62 is activated simultaneously with the operation of the client server 20, so that the indicator database 140 of other user can be communicated with in real-time.

Figure 8:
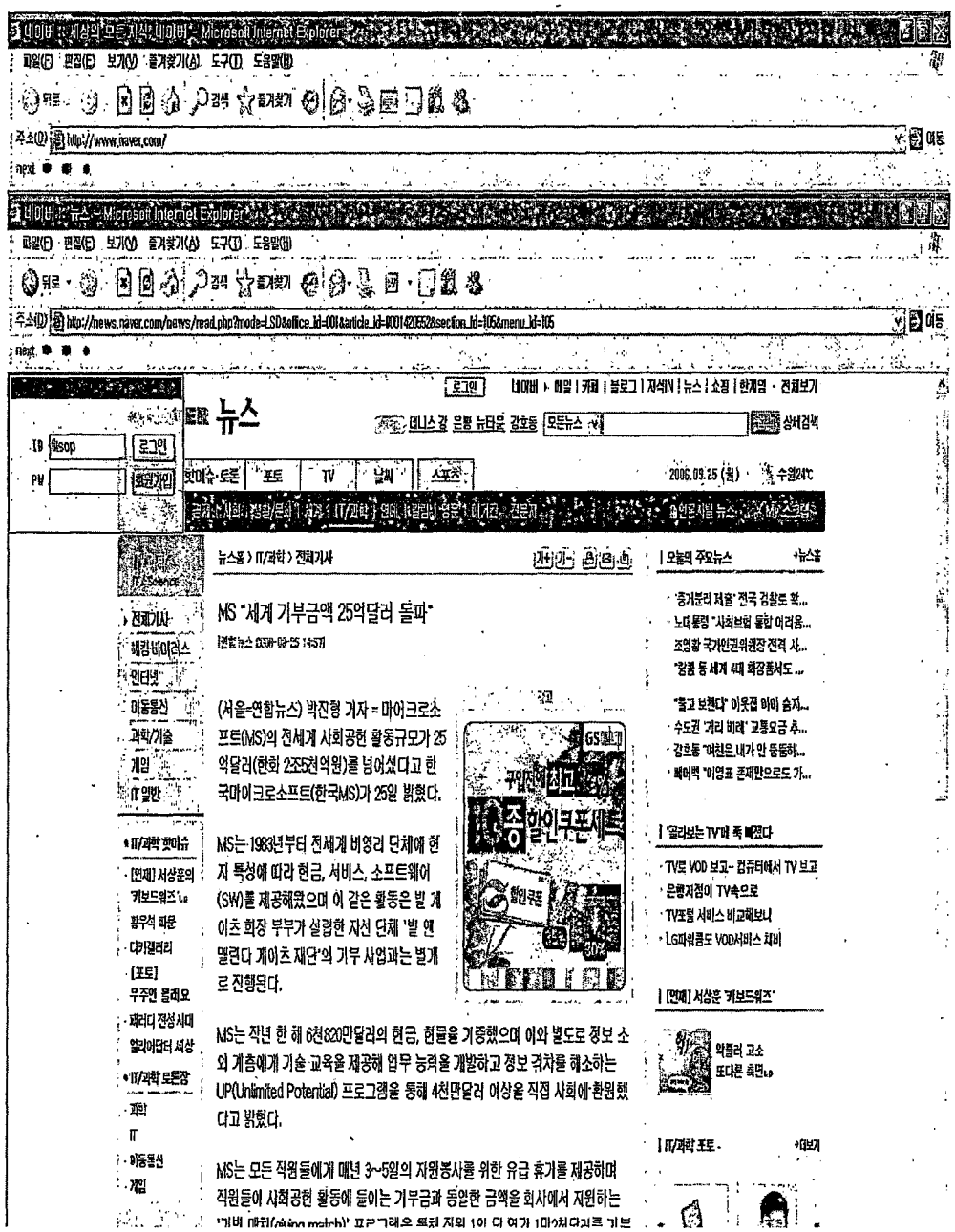
FIG. 8 is an example view illustrating a state, in that the client serve of the user is connected to the system server for operating the information share module.

FIG. 8 is an example view illustrating a state, in that the client serve 20 of the user is connected to the system server 30 for operating the information share module 210.

As shown in FIG. 8, the information share module 210 is a connection window provided through the desk band 62 of the tool bar 60 and can be immediately operated through a login connection. Also, in case of connecting to the website 50 covering all classifications and information and so forth on each webpage 40 and provided by the system server 30 through the login, the information share module 210 is immediately communicated with the website 50.

The system server 30 serves to store and manage the information of the member connected to the website 50 in the user database 70.

Again, referring to FIG. 2 and FIG. 3, an evaluation module 220 serves to evaluate the information of the indicator 100 through the desk band 62 of the client server 20 of other user. That is, the evaluation module 220 serves to generate and manage an evaluation window capable of displaying a point, a recommendation, an error indication and so forth on separate lower blanks of the indicator 100 in order to evaluate the information evaluation of the pertinent indicator 100 by means of other user. At this time, the indicator 100 of obtaining many recommendations is differentiated from other indicators 100 in terms of a basic color. Accordingly, as though the indicator 100 of many recommendations is located at the lower portion thereof, it can be easily distinguished from other one. Thus, where the information displayed on the indicator 100 is verified by many users that it is very valuable, the priority order selection module 170 can vest the highest order in the pertinent indicator 100.

The multi-level generation module 160 servers to attach the plurality of the indicator 100 on each webpage 40 in order to record the indicator of the first user together with other indicator 100 in case that a plurality of users is connected to the same webpage 40 through the information share module 210.

The multi-level generation module 160 and the priority order selection module 170 according the present invention are the core elements for providing the dynamic implementation of the indicator 100 according to the present invention.

That is, in the conventional generation working of the webpage, since the fabricated picture and documents are two-dimensionally fixed by using a HTML tag, in order to reconstruct the contents such as the pictures and documents provided in the menu, the transformation working of an image and so forth is again performed in the local computer by means of a web designer or a programmer and then, it is uploaded to the web server or a working is conducted by using a conventional home page fabrication wizard program. However, in this case, it is very difficulty for a general user to utilize the home page fabrication wizard. Accordingly, in the multi-level generation module 160 and the priority order selection module 170 according to the present invention, it can utilize the indicator 100 through a layer of a DHTML (Dynamic HTML) and a Drag & Drop manner, so that it can provide the dynamic implementation of the indicator 100, easily change the piling order thereof, and provide convenient working interface surroundings.

The DHTML (Dynamic HTML) includes a HTML and a Java script for assembling the background function of the fourth generation, so that the webpage can be dynamically transformed.

Figure 9:
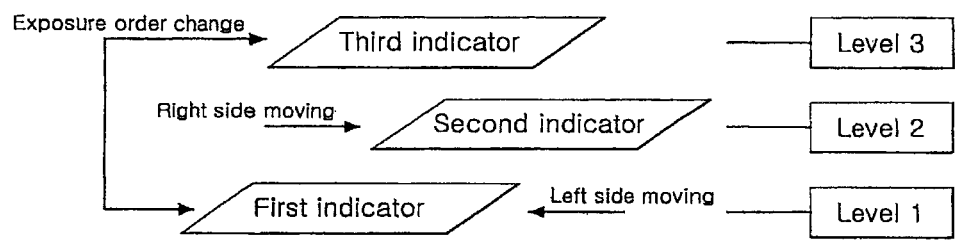
FIG. 9 illustrates a conceptual view illustrating a piled status of the plurality of indicators through the multi-level generation module.
Figure 9:
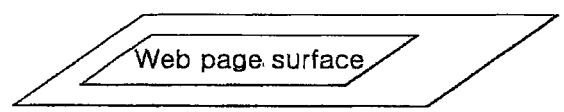
Figure 9:
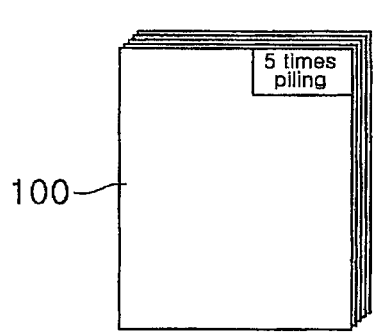
Figure 9:
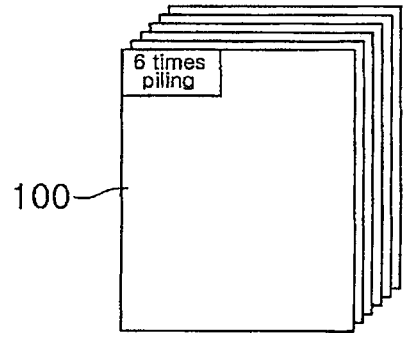

FIG. 9 illustrates a conceptual view illustrating a piled status of the plurality of indicators 100 through the multi-level generation module 160.

Firstly, referring to FIG. 9a, in order to overcome the conventional limit in that the priority order and overlap setting among the elements of each content cannot applied in real-time because the webpage made with the conventional HTML is constructed in the form of two-dimensional plane, the multi-level generation module 160 serves to construct the indicators 100 as a multilevel structure in case that the second and third users intend to overlap separator indicators with the first user's indicator 100. Since the multilevel indicator 100 has three dimensional shapes, each indicator 100 can be freely moved in the directions of x, z, and z-axis. Accordingly, the handler 63 capable of setting arbitrarily the order or piling location of the indicator 100 exposed to the upper portion thereof is provided in the tool bar 60, so that the exposure order of the indicator 100 can be arbitrarily determined through the operation of the handler 63.

The piling order thereof can be newly stored in the database 140 by upgrading it through the system server 30. Here, it is possible to empower the first user to determine the exposure order.

Also, where a plurality of semitransparent indicator 100 is stacked up another, since the writings of each indicator 100 are overlapped each other, it can bring about confusion. In order to prevent it, the classifiers 110 push to a separate space of one side of the webpage and are displayed on the space in order. Here, the portion of the display indicator 120 may be formed opaquely, so that only top content can be checked out.

As shown in FIG. 9((b) and (c)), the multi-level generation module 160 serves to allow the indicators 100 having the same size to completely overlap and display the number of the piling thereon in order to check it. Here, the number of the overlapped indicators 100 can be displayed on the corner of the top indicator 100.

In addition to the control of the exposure order of the indicator 100 by means of the multi-level generation module 160, the priority order selection module 170 servers to prepare his indicator 100 on the top position on the top preferential basis through the indicator database 140 transmitted from the pertinent client server 20 without respect to the basic exposure order by means of the multi-level generation module 160 in case that his indicator is existed in the pertinent webpage 40. Here, by means of the condition setting function of the handler 63, the user can select the exposure order voluntarily in order to arrange an indicator of obtaining many recommendations, a many-read indicator, a very objectively valuable indicator and so forth on the top position thereof.

In the meantime, the various information existed in the same webpage 40 can be confirmed as whether it is valuable as a specific information through a verification of various user by means of the multi-piling and prioritization of the indicators 100. Here, when the many indicators 100 are piled only on the specific webpage or only the indicators 100 of very small number are piled in spite of the passage of a predetermined time, it is necessary to judge the evaluation thereof as a quick information according to the amount of the information.

With this, the system 10 according to the present invention is provided with the piling number management module 180 and the generation time management module 190 for managing the basic property of the indicators 100.

Again, referring to FIG. 2 and FIG. 3, the piling number management module 180 servers to count the number of indicators 100 displayed on the contents of the specific webpage 40 and indicate the range of the piling number through a specific color. In other words, since important and sharp matters are included in the contents having many indicators 100, it is necessary to easily discriminate the piling number through the specific colors. For example, the piling number more than 5 times corresponds to a green color, the piling number more than 10 times to a blue color, and the piling number more than 50 times to a red color.

Also, in the generation time management module 190, where the indicators 100 below 5 times are included in the contents of the specific webpage and the piling number is not changed below 5 times after a lapse of about ten days, since the information didn't draw the user's attention, the layout of the indicators 100 becomes gradually dim, as time goes by.

That is, since the information capable of attracting public attention is comparatively valuable, it can predict that the unpopular information is not so valuable, so that the indicators 100 themselves becomes gradually dim as time goes by.

The piling number management module 180 and the generation time management module 190 serves to easily check out the state of the indicator 100 reflected by the interest and participation of various users, so that it can play an useful role in finding many information in a short time.

The advertisement display module 200 according to the present invention including a search engine 210, an advertisement database 202, and a display portion 203 serve to display the advertisement related to the content of the indicator, for example, the classifier 110 for illustrating the title, the keyword indicator 121, and the category indicator 123 on the corner of the indicator 100 as banner ads.

Concretely, the search engine 210 serves to play a role in finding a word related with the classifier 110 of the indicator 100 and so on and various advertisements having various concepts are recorded in the advertisement database 202. The display portion 203 serves to integrate the related word search by the search engine 210 with the selected advertisement database 202 to seek out the related advertisements, thereby displaying the selected advertisement on the banner located at the indicator 100 or the corner thereof.

By means of the advertisement display module 200, the system operator can guarantee the advertising gains as well as the advertisement itself can be provided as one information in case that the user finds the desiring goods information.

Figure 10:
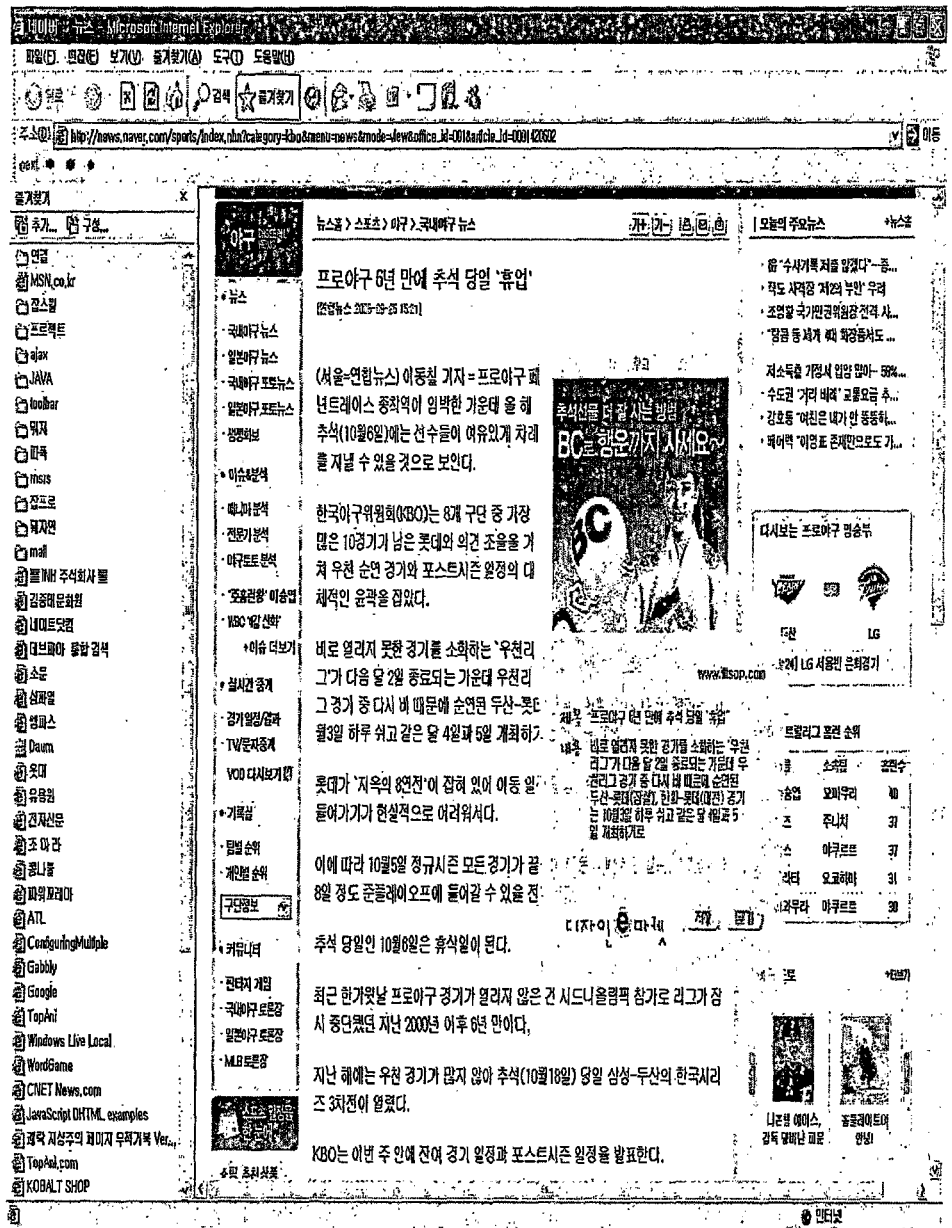
FIG. 10 is an example view illustrating a state in that the advertisement is embodied on the indicator by means of the advertisement display module.

FIG. 10 is an example view illustrating a state in that the advertisement is embodied on the indicator by means of the advertisement display module 200.

As shown in FIG. 10, the advertisement provided by the advertisement display module 200 can be displayed on one side of the inside of the indicator 100. As described above, it can be displayed on the outer periphery of the indicator 100, that is, outside of the indicator as banner ads.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A system for displaying and managing information on a webpage using an indicator, comprising:
    a client server comprising one or more processors and memory, the memory comprising:
        an indicator configured for display over specific contents of the webpage with reference to coordinate values corresponding to the specific contents of the webpage for classifying and elaborating on the specific contents, wherein a plurality of indicators associated with same specific content of the web page can be associated with different classifications of the same specific content; and
        an indicator generation module for generating the indicator, including a block setting portion for predicting a width of the specific contents of the webpage;
        a coordinate setting portion for grasping the coordinate value of a webpage area corresponding to the width of the specific contents;
        an input portion for inputting information to be recorded in the indicator, wherein the information to be recorded in the indicator is provided by a user and is different from the specific contents of the web page;
        an output portion for outputting the indicator to the specific contents of the webpage based on coordinate value information stored in the storage portion; and
        a multi-level generation module for controlling overlapping of the indicator and displaying the number of overlapped indicators on the top layer of the indicator;
    a piling number management module for changing a color of the indicators each time the indicators associated with the same specific content of the web page are piled by a predetermined piled number by means of the multi-level generation module;
    a generation time management module for allowing the plurality of indicators associated with the same specific content of the webpage to become dim when the piled number is not changed after lapsing of a predetermined time, indicating that the same specific content did not draw attention from users of the system; and a system server comprising one or more processors and memory, the memory comprising:
  a storage portion for storing the coordinate value; and
  an indicator database stored in the system server through the storage portion and collected according to specific classifications of indicators, wherein the indicator includes an item selected from the group consisting of:
  a user-drafted memo related to the webpage;
  an advertisement related to the webpage;
  a classifier for illustrating a title on the specific contents of the webpage;
  a keyword indicator for illustrating a path or a keyword for finding the webpage;
  an information indicator for recording actual contents and displaying an evaluation memo, an elaborate comment, and information of the webpage;
  a category indicator for setting up categories of the specific contents of the webpage; and
  a file attaching means for transmitting an attached file to the system server and calling it.

2. The system of claim 1, further comprising:
an information share module for enabling communication between one or more client servers and the system server so as to share the indicator database with other users connected to the system server.

3. The system of claim 1, further comprising:
a priority order selection module for providing the indicators piled by the multi-level generation module to a specific user according to a selected piling order based on the specific user's taste.

4. The system of claim 1, further comprising:
an advertisement display module having a search engine for searching a word related to the classifier of the indicator;
an advertisement database for recording advertisement information related to results from the search engine; and
a display portion for displaying the advertisement information into the indicator.

5. A computer-implemented method for displaying and managing information on a webpage, comprising:
  at a client server having one or more processors and memory storing one or more programs for execution by the one or more processors, the client server executing the steps of:
    displaying an indicator over specific contents of the webpage with reference to coordinate values corresponding to the specific contents of the webpage for classifying and elaborating on the specific contents, wherein a plurality of indicators associated with same specific content of the web page can be associated with different classifications of the same specific content;
    generating the indicator, including predicting a width of the specific contents of the webpage;
    grasping the coordinate value of a webpage area corresponding to the width of the specific contents;
    inputting information to be recorded in the indicator, wherein the information to be recorded in the indicator is provided by a user and is different from the specific contents of the web page;
    storing the coordinate value;
    outputting the indicator to the specific contents of the webpage based on stored coordinate value information;
    controlling overlapping of the indicator and displaying the number of overlapped indicators on the top layer of the indicator;
    changing a color of the indicators each time the indicators are piled by a predetermined piled number associated with the same specific content of the web page by means of the multi-level generation module;
    allowing the pluralityindicators associated with the same specific content of the webpage to become dim, when the piled number is not changed after lapsing of a predetermined time, indicating that the same specific content did not draw attention from users of the system; and
    collecting indicators in an indicator database according to specific classifications for storage in a system server, wherein the indicator includes an item selected from the group consisting of:
    a user-drafted memo related to the webpage;
    an advertisement related to the webpage;
    a classifier for illustrating a title on the specific contents of the webpage;
    a keyword indicator for illustrating a path or a keyword for finding the webpage;
    an information indicator for recording actual contents and displaying an evaluation memo, an elaborate comment, and information of the webpage;
    a category indicator for setting up categories of the specific contents of the webpage; and
    a file attaching means for transmitting an attached file to the system server and calling it.

6. The method of claim 5, further comprising:
enabling communication between one or more of the client servers and the system server so as to share the indicator database with other users connected to the system server.

7. The method of claim 5, further comprising:
providing the indicators to a specific user according to a selected piling order based on the specific user's taste.

8. The method of claim 5, further comprising:
searching in a search engine a word related to the classifier of the indicator;
recording advertisement information related to results from the search engine; and
displaying the advertisement information into the indicator.

9. A non-transitory computer readable storage medium having stored thereon a set of instructions that, when executed by a computer system, cause the computer system to perform a method comprising:
  displaying an indicator over specific contents of the webpage with reference to coordinate values corresponding to the specific contents of the webpage and for classifying and elaborating on the specific contents, wherein a plurality of indicators associated with same specific content of the web page can be associated with different classifications of the same specific content;
  generating the indicator, including predicting a width of the specific contents of the webpage;
  grasping the coordinate value of a webpage area corresponding to the width of the specific contents;
  inputting information to be recorded in the indicator, wherein the information to be recorded in the indicator is provided by a user and is different from the specific contents of the web page;
  storing the coordinate value;
  outputting the indicator to the specific contents of the webpage based on stored coordinate value information;

controlling overlapping of the indicator and displaying the number of overlapped indicators on the top layer of the indicator;

changing a color of the indicators each time the indicators associated with the same specific content of the web page are piled by a predetermined piled number by means of the multi-level generation module;

allowing the plurality of indicators associated with the same specific content of the webpage to become dim, when the piled number is not changed after lapsing of a predetermined time, indicating that the same specific content did not draw attention from users of the system; and collecting indicators in an indicator database according to specific classifications for storage in a system server, wherein the indicator includes an item selected from the group consisting of:

a user-drafted memo related to the webpage;

an advertisement related to the webpage;

a classifier for illustrating a title on the specific contents of the webpage;

a keyword indicator for illustrating a path or a keyword for finding the webpage;

an information indicator for recording actual contents and displaying an evaluation memo, an elaborate comment, and information of the webpage;

a category indicator for setting up categories of the specific contents of the webpage; and a file attaching means for transmitting an attached file to the system server and calling it.

* * * * *